Oct. 28, 1924.
A. E. KRICK
1,513,727
DRYING CONTROL APPARATUS
Filed April 10, 1922
2 Sheets-Sheet 1
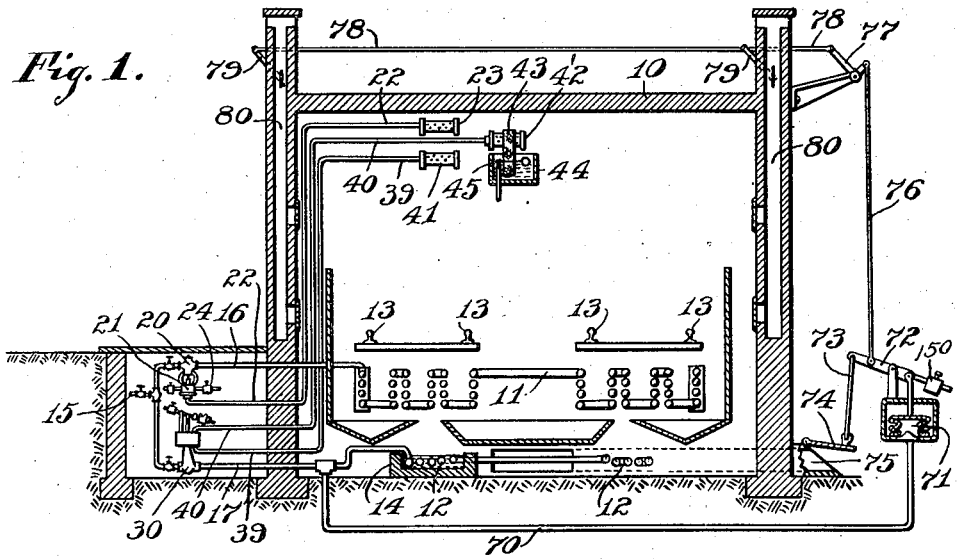
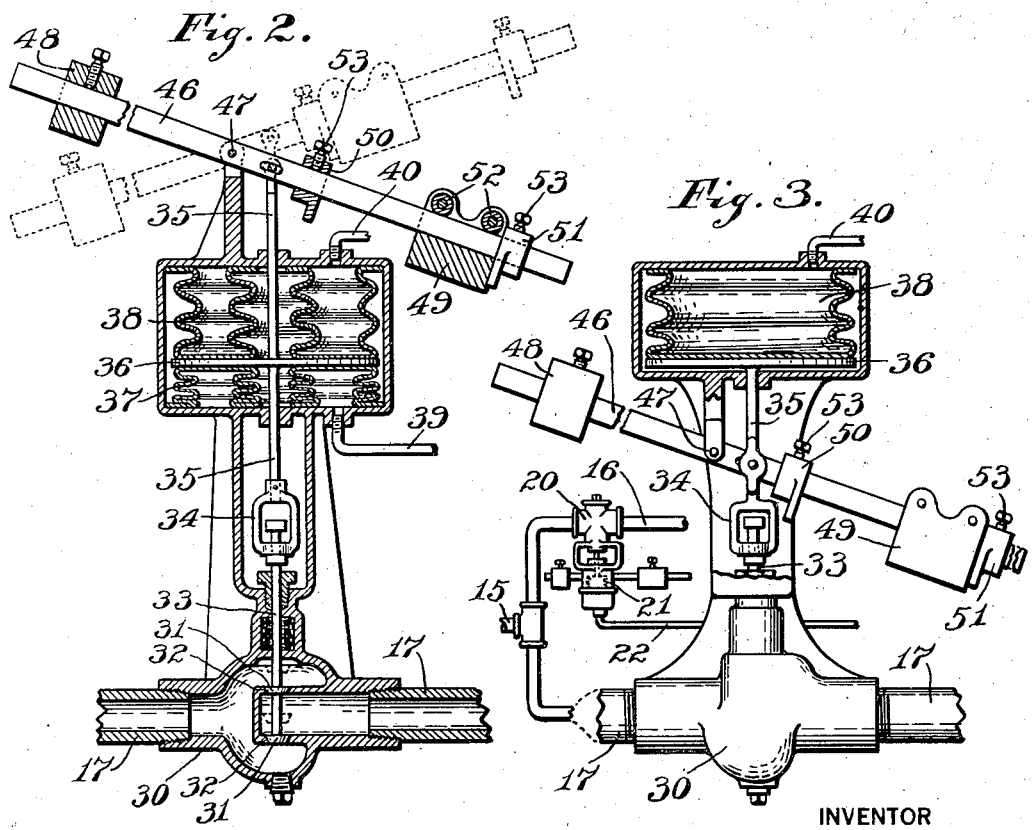
INVENTOR
Arthur E. Krick,
BY
G. B. Schley.
ATTORNEY

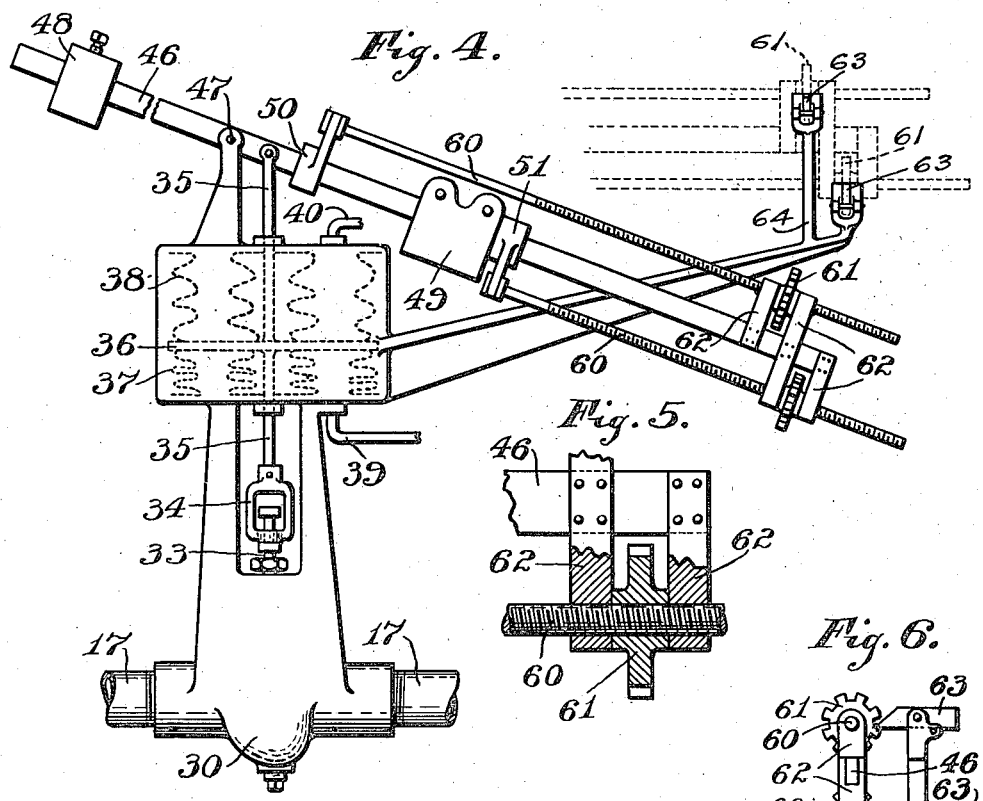
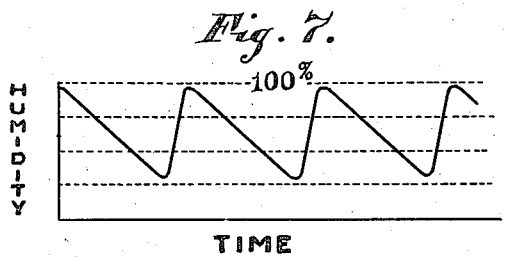
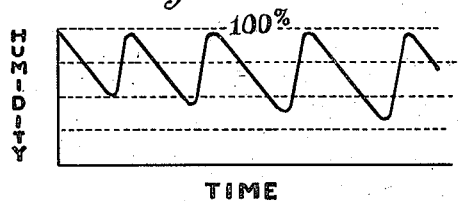
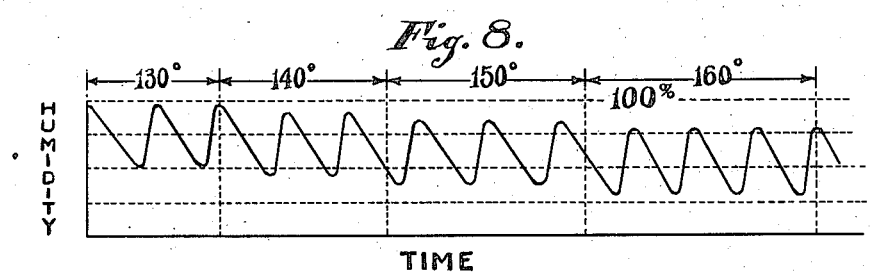

Patented Oct. 28, 1924.

1,513,727

UNITED STATES PATENT OFFICE.

ARTHUR E. KRICK, OF INDIANAPOLIS, INDIANA, ASSIGNOR TO THE HUMIDITY CONTROL COMPANY, OF INDIANAPOLIS, INDIANA, A CORPORATION OF INDIANA.

DRYING-CONTROL APPARATUS.

Application filed April 10, 1922. Serial No. 551,053.

*To all whom it may concern:*

Be it known that I, ARTHUR E. KRICK, a citizen of the United States, residing at Indianapolis, in the county of Marion and State of Indiana, have invented a new and useful Drying-Control Apparatus, of which the following is a specification.

It is the object of my invention both to improve and accelerate kiln-drying, with especial reference to the drying of lumber.

Heretofore in the kiln-drying of lumber, it has been necessary to maintain comparatively high relative humidities and comparatively low temperatures during the first part of the operation, usually for at least half of the entire drying time or longer, in order to keep the lumber from cracking, splitting, hollow-horning, and case-hardening. Even by doing this, the best results were not always obtained, and the defects mentioned above to be guarded against nevertheless frequently appeared; and in addition the maintenance of these high relative humidities and low temperatures so far into the drying period made a long drying period necessary.

According to my present invention I both lessen the time required for drying, and obtain equally as good results if not better results in the quality of the dried lumber.

I do this, fundamentally, by departing entirely from the time-honored practice of attempting to maintain the relative humidity constant or substantially so for a given period; and instead I periodically and alternately lower such relative humidity to a very low point and then raise it to a high point, to soften the surface of the lumber each time the cycle reaches the high point, the high point preferably being at or fairly close to saturation during at least the early stages of the drying, and control this lowering and raising of the relative humidity by the rise and fall thereof to predetermined values. I raise the relative humidity rapidly, and let it fall slowly, stopping the rise when the desired maximum relative-humidity point is reached, and continuing the fall until moisture is being given off by the lumber so slowly that the relative humidity in the kiln falls to the predetermined minimum. I prefer to raise the relative humidity by discharging live steam into the kiln; and this not only raises the relative humidity but also temporarily raises to some extent the temperature even within the interior of the lumber, largely by reason of the latent heat which the steam gives up, and also temporarily adds moisture to the lumber at and near the surface to permit the readier passage therethrough of moisture from the interior. Thus the average relative humidity is very much lower than has heretofore been the practice, with a resultant decrease in the time required for drying; but the periodic increases of the relative humidity maintain the surface portions of the lumber in suitable condition for rapid drying, and produce a recurrent condition of greater temperature within the body of the lumber than outside of the lumber in the kiln and thereby promote the driving out of the moisture from the interior, and facilitate this by recurrently adding superficial moisture to the lumber; and effectively avoid splitting, cracking, hollow-horning and case-hardening. Moreover, I find it is possible to increase very materially the drying temperature, without injuring the quality of the dried lumber obtained, which makes further for acceleration of the drying process.

This present application is directed to the apparatus for obtaining this drying control. The process of drying control which is also disclosed in this application is claimed in my co-pending application Serial No. 671,111 filed October 27, 1923, for process of drying control, which co-pending application is in part a continuation of this present application; for while in practicing such process I prefer to use the apparatus claimed in the present application, such process may be practiced otherwise.

The accompanying drawings illustrate my invention. Fig. 1 is a transverse section through a kiln equipped with a control arrangement which I may use in carrying out my invention, with the heating and humidifying means shown diagrammatically; Fig. 2 is a section through a humidifying-steam control valve and its operating means, embodying my invention in one form, with the valve controlled in response to both dry-bulb and wet-bulb temperatures; Fig. 3 is a view similar to Fig. 2, but with the control-valve controlled in response to the wet-bulb temperature alone; Fig. 4 is a view somewhat similar to Fig 2, but with automatically movable stops for the sliding weight; Fig. 5 is an enlarged sectional detail of one of the stop-shifting wheels of Fig. 4; Fig. 6 is an end view of the lever and stop-shifting wheels of Fig. 4, with the co-operating shifting dogs; and Figs. 7, 8, and 9 are time-humidity diagrams indicating the effects of the operation of the controlling means in Figs. 2, 3, and 4 respectively.

The dry kiln 10 may be of any desired type, with any suitable heating means 11 and with any suitable air-humidifying means 12, and with any suitable arrangements for supporting the lumber or other material to be dried, such as the tracks 13 for supporting trucks which carry such lumber. As shown, both the heating means 11 and the air-humidifying means 12 are steam coils. They are shown below the tracks 13, but this is immaterial; and the air-humidifying coils are shown as being in part coils located in water in a water tank 14, to produce evaporation of water from such tank, and in part as steam-spray coils, though either type of air-humidifying coils may be used alone, or other types of air-humidifying means may be used instead. The steam for both heating and humidification is shown as being supplied from a main steam supply line 15, which is branched to provide a supply line 16 leading to the heating coils 11 and a supply line 17 leading to the air-humidifying coils 12.

In the supply line 16 to the heating coils 11 is a control valve 20, which in the preferred form of my invention is operated by a fluid-pressure motor member 21 connected by a pipe 22 to a suitable vapor-pressure thermostat 23 within the kiln 10. The valve 20 is automatically operated to maintain substantially normal the temperature within the kiln 10; for if the temperature rises in the kiln the vapor-pressure developed in the thermostat 23 also rises to cause the motor member 21 to move the valve 20 toward closed position, to cut down the supply of heating steam to the heating coils 11; while if the temperature falls the reverse series of actions takes place, to increase the supply of steam to the heating coils 11. The motor member 21 and valve 20 are conveniently provided with suitable adjusting means, such as an adjustable weight 24, by which the temperature which is maintained in the kiln may be varied from time to time, as the drying proceeds.

In the supply line 17 to the air-humidifying means 12 is a control valve 30. I have shown this valve as a balanced valve, having a twin valve-member 31 movable with relation to twin valve-seats 32 to open and close the valve. The valve-member 31 has a valve stem 33, which is connected through a lost-motion connection 34 to a shifter rod 35. The shifter rod 35 is controlled in response to variations in relative humidity within the kiln 10 to open the valve 30 when the relative humidity drops to a certain low value, say 30%, and to close such valve 30 when the relative humidity rises to a certain high value, say 98%, but to be without effect on the valve for intermediate relative humidities. In consequence, when the valve 30 is closed, the relative humidity drops gradually until its low value is reached; whereupon the valve 30 is opened to admit air-humidifying steam, to cause the relative humidity to rise until the high value is reached; whereupon the valve 30 is again closed, and the cycle is repeated. The drop in relative humidity is relatively slow, and the rise relatively rapid.

One simple form of mechanism for doing this is shown in Figs. 1 and 2. This arrangement makes use of the invention set forth in by prior Patent No. 1,315,517, granted September 9, 1919. In this arrangement the shifter rod 35 is provided with a thrust plate 36, which is acted on in opposite directions by two fluid-pressure expansible motor-members 37 and 38, which are connected by two pipes 39 and 40 to two vapor-pressure thermostats 41 and 42 respectively. The thermostat 41 is a dry-bulb thermostat, and the pressure therefrom acts in the motor-member 37 to tend to open the valve 30. The thermostat 42 is a wet-bulb thermostat, and the pressure therefrom acts in the motor-member 38 to tend to close the valve 30. The wet-bulb thermostat 42 may be kept wetted in any suitable way, as by a wick 43 which overlies such wet-bulb thermostat and dips into water maintained at a constant level in a water tank 44 by a suitable float valve 45. The shifter rod 35 is connected to a lever 46, suitably mounted on a fixed pivot 47. The lever 46 carries a normally fixed but adjustable weight 48, for adjusting in common the points at which the valve operates; and also carries a shifting weight 49 which is arranged to slide along the lever 46 between two stops 50 and 51. To reduce the sliding friction, the weight 49 is preferably carried by rollers 52 which travel on the upper face of the lever 46. The stops 50 and 51 may be adjusted along the lever 46, to control separately the points of high-humidity and low-humidity at which the valve operates; and in the arrangement shown in Figs. 2 and 3 are manually adjustable, and provided with set-screws 53 by which they are clamped in adjusted position.

In the operation of the device shown in Figs. 1 and 2, assume that the valve 30 is closed, so that no air-humidifying steam is being supplied to the coils 12, and also assume that the lever 46 is in the full-line position shown in Fig. 2. As no air-humidifying steam is being supplied, the relative humidity within the kiln 10 drops, so that there is more evaporation from the wick 43 and therefore a decrease in the wet-bulb temperature with relation to the dry-bulb temperature. This results in a decrease in the pressure exerted in the wet-bulb motor-member 38, so that relatively the pressure of the dry-bulb motor-member 37 predominates more and more over that of the wet-bulb motor-member 38 and lifts upward the shifter rod 35 and the right-hand end of the lever 46. At first, this does not affect the valve stem 33 and valve member 31, because of the lost-motion connection 34. As the upward movement of the shifter rod 35 continues, the lever 46 passes through the horizontal position, so that it tilts downward toward the left. Then the shifting weight 49 slides down hill along the lever 46 toward the fulcrum 47 until stopped by the stop 50. This movement of the weight 49 lessens its mechanical advantage, for it helps hold the shifter rod 35 downward against the pressure of the dry-bulb motor-member 37, and because of this sudden reduction in the resistance to the operation of the motor member 37 such dry-bulb motor-member now quickly lifts up the shifter rod 35 the remainder of its distance. This moves the lever 46 to the dotted-line position in Fig. 2, and also, as the lost-motion of the connection 34 has now been taken up, it lifts the valve stem 33 to open the valve 30. The opening of this valve admits air-humidifying steam to the coils 12, and this steam causes the rather rapid humidification of the air in the kiln 10, raising it quickly from the low point to which it has fallen to or nearly to 100%.

This rapid raising of the relative humidity also simultaneously raises to some extent the temperature in the kiln, even though the temperature-control regularly shuts off the heating steam, because the humidifying steam inevitably brings in heat with it, and this heat is given up by the steam, mainly from its latent heat; and this causes a rising in temperature in the lumber, even in the interior thereof. In addition, this steam temporarily softens the surface of the lumber, by adding moisture to such surface, and thus makes easier the passage of moisture therethrough from the interior. During part of the period during which the relative humidity is dropping, the temperature within the body of the lumber is higher than that within the remainder of the kiln, due to the heating effect of the latent heat of the steam during the humidifying period. This is due to the fact that the interior of the lumber is heated during the rise in temperature while humidifying steam is being admitted, but the temperature is quickly brought back to normal in the air of the kiln by the temperature controller as soon as the humidifying steam is shut off, thus lowering the temperature of the air in the kiln below the temperature which the interior of the lumber has attained. As a result of this over-temperature of the interior of the lumber at certain times, a still greater tendency to drive the moisture out to the surface of the lumber is produced, as moisture tends to flow in wood from a point of higher temperature to a point of lower temperature. This flow of moisture from the inside out is made easier by the recurrent softening produced by the humidifying steam on the surface parts of the lumber. The temporary rises of temperature in the kiln during the humidifying periods are superposed on the normally constant temperature which the temperature-controller otherwise substantially maintains, and save at these periods do not interfere with the maintenance of such normally constant temperature. As the relative humidity rises, the evaporation from the wick 43 becomes less rapid, so that the wet-bulb temperature rises; in consequence of which the pressure developed in the wet-bulb thermostat 42 increases, and acts through the motor-member 38 to force the shifting rod 35 gradually downward. At first, this does not affect the valve stem 33, because of the lost-motion connection 34; but when the downward movement of the shifter rod 35 has continued sufficiently far to make the lever 46 slant downward toward the right, the weight 49 slides outward on such lever 46 from the fulcrum 47, until stopped by the stop 51. This outward movement of the weight 49 increases its mechanical advantage, and causes the shifter rod 35 to move quickly downward the remainder of its distance, to take up the remainder of the lost-motion of the connection 34 and to move the valve member 31 to closed position to shut off the supply of air-humidifying steam. Thereupon the relative humidity in the kiln 10 gradually drops, until the low point is reached. Then the cycle above described is again repeated.

In Fig. 7 I have given a chart showing the variation in humidity through several cycles, it being assumed that the dry-bulb temperature in the kiln 10 remains constant, under the control of the valve 20. Indeed, this chart of Fig. 7 indicates fairly well the conditions even though the temperature in the kiln 10 is not maintained constant, but is allowed to vary at random or under some system of variation such as a gradual increase throughout the drying period. In other words, even though the dry-bulb temperature varies, the apparatus of Figs 1 and 2 will cause a fluctuation in the relative humidity between relatively constant maximum and minimum values, though these may not be absolutely constant when the dry-bulb temperature changes.

In the arrangement shown in Fig. 3, I eliminate the dry-bulb-temperature-controlled motor-member 37, and control the valve 30 wholly by the wet-bulb-temperature-controlled motor-member 38. This is entirely practicable if there is a definite control of the dry-bulb temperature of the kiln, as by the valve 20 under the control of the dry-bulb thermostat 23. For a given dry-bulb temperature, variations in relative humidity cause a corresponding variation in the pressure developed by the motor-member 38, to operate the valve 30 substantially as already explained. For a given temperature in the dry-kiln 10, the chart showing the relative-humidity variations will be substantially that of Fig. 7, just as with the arrangement of Figs. 1 and 2. If the dry-bulb temperature is changed from time to time, however, as is usually the case in lumber drying by reason of periodic increases in temperature from the beginning to the end of the drying period, the control arrangement shown in Fig. 3 will produce a chart substantially such as shown in Fig. 8, where the temperature is shown as starting at 130° and as increasing at various times, at the points indicated by the vertical dotted lines. In other words, with the arrangement shown in Fig. 3, there is a chart such as shown in Fig. 7 for each constant-temperature part of the drying period, but as between successive periods of higher temperature the line indicating the variations in relative humidity is vertically displaced, to a lower position on the chart for each increase in the dry-bulb temperature. There are sometimes some advantages in this.

It is sometimes desirable to have the successive peaks or troughs, or both, of the humidity-variation line at different heights. This can be obtained in either of the devices shown, by varying the lengths of successive movements of the weight 49 along the lever 46. I have shown one arrangement for doing this in Figs. 4, 5, and 6, which otherwise has the same arrangement of parts as in Fig. 2, with the shifter rod 35 operated by the opposing action of the two motor-members 37 and 38 responding respectively to the dry-bulb temperature and to the wet-bulb temperature in the dry kiln 10. Here the stops 50 and 51 for the shifting weight 49 are not set by set-screws, as in Figs. 2 and 3, but instead one or both of them may be automatically shiftable along the lever 46, both stops being shown as thus shiftable. This shifting of one or both stops may be obtained in any suitable way, preferably by the tilting of the lever 46 itself. As shown, each of the stops 50 and 51 is connected by a longitudinally extending screw 60, swiveled in the stop, to an externally toothed nut 61 working between abutments 62 mounted on the lever 46 near its outer end. The teeth of the two toothed nuts 61 cooperate with tilting dogs 63 carried on any suitable fixed support 64, to cause turning of such nuts 61 in one direction only, by a ratchet action, upon each tilting movement of the lever 46. This may be arranged to produce any desired movements of the stops 50 and 51, or either of them; and by properly setting the dogs 63 the relative movements of the two stops may be anything desired. In Fig. 9 I have shown the effect of an automatic movement of the stop 51 outward by successive tiltings of the lever 46, the stop 50 being assumed to be stationary. By such movements of the stops 51 outward, the weight 49 moves successively further outward along the lever 46 upon successive downward swings of the right-hand end of the lever; in consequence of which it is necessary for the relative humidity to fall to successively lower values in the successive troughs of the humidity curve before the force of the wet-bulb-temperature-controlled motor-member 38 is diminished sufficiently to permit the right-hand end of the lever 46 to be tilted upward again.

In addition to controlling the temperature and the relative humidity in the kiln 10, I may also control the ventilation of the kiln, by the operation of the same valve 30 which controls the supply of air-humidifying steam. I have shown this diagrammatically in Fig. 1. Here a branch pipe 70 from the supply line 17 to the air-humidifying means extends to a fluid-pressure motor 71, shown as of the bellows type, which is connected to operate a lever 72. The lever 72 is suitably connected by a link 73 to a flapper valve 74 controlling the entrance to the air-intake duct 75, and is also connected by a link 76, a bell-crank 77, and a link 78 to a butterfly valve 79 in the outlet flues 80. When the valve 30 is closed, the bellows 71 collapses under the action of the weight 150, adjustably carried by the lever 72 and opposing such bellows, to open the valves 74 and 79 during the time the air-humidifying steam is cut off, so that there will be ventilation and air-circulation during the humidity-decrease parts of the time-humidity curves in Figs. 7, 8, and 9; but when the low-humidity point has been reached and the valve 30 has been opened to admit air-humidifying steam through the supply line 17 to the humidifying coils 12, part of the steam thus admitted passes through the pipe 70 and expands the bellows 71, to cause the closing of the valves 74 and 79 so long as such air-humidifying steam is being supplied. When the peaks of the curves in Figs. 7, 8, and 9 are reached to cause the closing of the valve 30, this not only shuts off the air-humidifying steam, but also permits the steam in the bellows 71 to escape through the steam-spray holes of the coils 12 so that such bellows again collapses, to cause the opening of the valves 74 to 79.

I claim as my invention:

1. In combination, a dry-kiln, air-humidifying means therefor, control means for controlling said air-humidifying means, and automatic means for operating said control means to produce alternate lowerings and raisings of the relative humidity of the air in the dry-kiln, said control means being arranged to shift at each operation the relative-humidity value of its point of operation.

2. In combination, a dry-kiln, air-humidifying means therefor, control means for controlling said air-humidifying means, automatic means for operating said control means to produce alternate lowerings and raisings of the relative humidity of the air in the dry-kiln, said control means being arranged to shift at each operation the relative-humidity value of its point of operation, and means for normally maintaining the temperature of said kiln substantially constant.

3. In combination, a dry-kiln, air-humidifying means therefor, a control valve for said air-humidifying means, means controlled by the wet-bulb temperature of the air in said dry-kiln for controlling said control valve, and means associated with said control valve and its controlling means for raising and lowering the relative-humidity value at which the control valve is operated upon each closing and opening respectively of the control valve.

4. In combination, a dry-kiln, air-humidifying means therefor, a control valve for said air-humidifying means, means controlled by the wet-bulb temperature of the air in said dry kiln for controlling said control valve, and a snap-action device associated with said control valve and its controlling means, said snap-action device being arranged at each operation of said control valve to shift the wet-bulb temperature of the operating point of said control valve.

5. In combination, a dry-kiln, air-humidifying means therefor, a control valve for said air-humidifying means, means controlled jointly by the wet-bulb temperature and the dry-bulb temperature of the air in said dry-kiln for controlling said control valve, and means associated with said control valve and its controlling means for raising and lowering the relative-humidity value at which the control valve is operated upon each closing and opening respectively of the control valve.

6. In combination, a dry-kiln, air-humidifying means therefor, a control valve for said air-humidifying means, means controlled jointly by the wet bulb temperature and the dry-bulb temperature of the air in said dry kiln for controlling said control valve, and a snap-action device associated with said control valve and its controlling means, said snap-action device being arranged at each operation of said control valve to change the effective relation between the wet-bulb and dry-bulb temperatures necessary to produce movement of the valve.

7. In combination, a dry-kiln, air-humidifying means therefor, a control valve for said air-humidifying means, means controlled by the wet-bulb temperature of the air in said dry-kiln for controlling said control valve, means associated with said control valve and its controlling means for raising and lowering the relative-humidity value at which the control valve is operated upon each closing and opening respectively of the control valve, heating means for said dry-kiln, and means controlled by the dry-bulb temperature of the air in said dry-kiln for controlling said heating means.

8. In combination, a dry-kiln, air-humidifying means therefor, a control valve for said air-humidifying means, means controlled by the wet-bulb temperature of the air in said dry-kiln for controlling said control valve, a snap-action device associated with said control valve and its controlling means, said snap-action device being arranged at each operation of said control valve to shift the wet-bulb temperature of the operating point of said control valve, heating means for said dry-kiln, and means controlled by the dry-bulb temperature of the air in said dry-kiln for controlling said heating means.

9. In combination, a dry-kiln, air-humidifying means therefor, control means for controlling said air-humidifying means, automatic means for operating said control means to produce alternate lowerings and raisings of the relative humidity of the air in the dry-kiln, said control means being arranged to shift at each operation the relative-humidity value of its point of operation, and means controlled jointly with said air-humidifying means for controlling the air-circulation through said kiln.

10. In combination, a dry-kiln, air-humidifying means therefor, control means for controlling said air-humidifying means, automatic means for operating said control means to produce alternate lowerings and raisings of the relative humidity of the air in the dry-kiln, said control means being arranged to shift at each operation the relative-humidity value of its point of operation, means for normally maintaining the temperature of said kiln substantially constant, and means controlled jointly with said air-humidifying means for controlling the air-circulation through said kiln.

11. In combination, a dry-kiln, air-humidifying means therefor, a control valve for said air-humidifying means, means controlled by the wet-bulb temperature of the air in said dry-kiln for controlling said control valve, means associated with said control valve and its controlling means for raising and lowering the relative-humidity value at which the control valve is operated upon each closing and opening respectively of the control valve, and air-circulation control-means for said kiln also controlled by said control valve.

12. In combination, a dry-kiln, air-humidifying means therefor, a control valve for said air-humidifying means, means controlled by the wet-bulb temperature of the air in said dry-kiln for controlling said control valve, and air-circulation control-means for said kiln also controlled by said control valve.

13. In combination, a dry-kiln, air-humidifying means therefor, a control valve for said air-humidifying means, means controlled by the wet-bulb temperature of the air in said dry kiln for controlling said control valve, a snap-action device associated with said control valve and its controlling means, and air-circulation control-means for said kiln also controlled by said control valve.

14. In combination, a dry-kiln, air-humidifying means therefor, a control valve for said air-humidifying means, means controlled jointly by the wet-bulb temperature and the dry-bulb temperature of the air in said dry-kiln for controlling said control valve, means associated with said control valve and its controlling means for raising and lowering the relative-humidity value at which the control valve is operated upon each closing and opening respectively of the control valve, and air-circulation control means for said kiln also controlled by said control valve.

15. In combination, a dry-kiln, air-humidifying means therefor, a control valve for said air-humidifying means, means controlled jointly by the wet-bulb temperature and the dry-bulb temperature of the air in said dry-kiln for controlling said control valve, and air-circulation control-means for said kiln also controlled by said control valve.

16. In combination, a dry-kiln, air-humidifying means therefor, a control valve for said air-humidifying means, means controlled jointly by the wet-bulb temperature and the dry-bulb temperature of the air in said dry-kiln for controlling said control valve, a snap-action device associated with said control valve and its controlling means, and air-circulation control-means for said kiln also controlled by said control valve.

17. In combination, a dry-kiln, air-humidifying means therefor, a control valve for said air-humidifying means, means controlled by the wet-bulb temperature of the air in said dry-kiln for controlling said control valve, means associated with said control valve and its controlling means for raising and lowering the relative-humidity value at which the control valve is operated upon each closing and opening respectively of the control valve, air circulation control-means for said kiln also controlled by said control valve, heating means for said dry-kiln, and means controlled by the dry-bulb temperature of the air in said dry kiln for controlling said heating means.

18. In combination, a dry-kiln, air-humidifying means therefor, a control valve for said air-humidifying means, means controlled by the wet-bulb temperature of the air in said dry-kiln for controlling said control valve, air-circulation control means for said kiln also controlled by said control valve, heating means for said dry-kiln, and means controlled by the dry-bulb temperature of the air in said dry-kiln for controlling said heating means.

19. In combination, a dry-kiln, air-humidifying means therefor, a control valve for said air-humidifying means, means controlled by the wet-bulb temperature of the air in said dry-kiln for controlling said control valve, a snap-action device associated with said control valve and its controlling means, air-circulation control-means for said kiln also controlled by said control valve, heating means for said dry-kiln, and means controlled by the dry-bulb temperature of the air in said dry-kiln for controlling said heating means.

20. In combination, a dry-kiln, air-humidifying means therefor, a control valve for said air-humidifying means, means controlled by the wet-bulb temperature of the air in said dry-kiln for controlling said control valve, means associated with said control valve and its controlling means for raising and lowering the relative-humidity value at which the control valve is operated upon each closing and opening respectively of the control valve, and means for periodically varying one or both of the points to which said relative humidity is raised and lowered.

21. In combination, a dry-kiln, air humidifying means therefor, a control valve for said air-humidifying means, means controlled by the wet-bulb temperature of the air in said dry-kiln for controlling said control valve, a snap-action device associated with said control valve and its controlling means, and means for periodically varying one or both of the two different relative-humidity values at which said snap-action device permits the operation of said control valve.

22. In combination, a dry-kiln, air-humidifying means therefor, a control valve for said air-humidifying means, means controlled jointly by the wet-bulb temperature and the dry-bulb temperature of the air in said dry-kiln for controlling said control valve, means associated with said control valve and its controlling means for raising and lowering the relative-humidity value at which the control valve is operated upon each closing and opening respectively of the control valve, and means for periodically varying one or both of the points to which said relative humidity is raised and lowered.

23. In combination, a dry-kiln, air-humidifying means therefor, a control valve for said air-humidifying means, means controlled jointly by the wet-bulb temperature and the dry-bulb temperature of the air in said dry-kiln for controlling said control valve, a snap-action device associated with said control valve and its controlling means, and means for periodically varying one or both of the two different relative-humidity values at which said snap-action device permits the operation of said control valve.

24. In combination, a dry-kiln, air-humidifying means therefor, control means for controlling said air-humidifying means, and automatic means for operating said control means to produce alternate lowerings and raisings of the relative-humidity of the air in the dry-kiln, said control means being arranged to shift at each operation the relative-humidity value of its point of operation oppositely to the change such operation produces in said relative humidity.

25. In combination, a control valve, a power-operated device for operating said control valve, a weight acting to vary the effect of said power-operated device, said weight being arranged to act with different force on said power-operated device during its valve-opening and its valve-closing movements, and means for controlling said power-operated device by the relative humidity of a body of air.

26. In combination, a control valve, two power-operated devices acting in opposition on said control valve for opening and closing it, and means acting to assist one and oppose the other of said devices, said last-named means being arranged to act with different force on said power-operated devices during their valve-opening and valve-closing movements.

27. In combination, a control valve, a power-operated device for operating said control valve, means acting to vary the effect of said power-operated device, said means being arranged to act with different force on said power-operated device during its valve-opening and its valve-closing movements, and means for controlling said power-operated device by the relative humidity of a body of air.

28. In combination, a control valve, a power-operated device for positively operating said control valve in both directions, a weight acting to vary the effect of said power-operated device, said weight being arranged to act with different force on said power-operated device during its valve-opening and its valve-closing movements, and a lost-motion connection between said power-operated means and said control valve.

29. In combination, a control valve, two power-operated devices acting in opposition on said control valve for opening and closing it, means acting to assist one and oppose the other of said devices, said last-named means being arranged to act with different force on said power-operated devices during their valve-opening and valve-closing movements, and a lost-motion connection between said power-operated devices and said control valve.

30. In combination, a control member, a power-operated device for positively operating said control member in both directions, a lever connected to said power-operated device and arranged to be tilted in opposite directions from the horizontal by the operation of said power-operated device, a weight carried by said lever and shiftable along it to vary its mechanical advantage when the tilting of the lever is reversed, and a lost-motion connection between said power-operated device and said control member.

31. In combination, a control member, operating means for positively operating said control member in both directions, a lever connected to said operating means and arranged to be tilted in opposite directions from the horizontal by the operation of said operating means, a weight carried by said lever and shiftable along it to vary its mechanical advantage when the tilting of the lever is reversed, and a lost-motion connection between said operating means and said control member.

32. In combination, a control member, operating means for operating said control member, a lever connected to said operating means and arranged to be tilted in opposite directions from the horizontal by the operation of said operating means, a weight carried by said lever and shiftable along it to vary its mechanical advantage when the tilting of the lever is reversed, a stop for limiting the shifting of said weight along the lever, and means for automatically shifting said stop.

33. In combination, a control member, operating means for operating said control member, a lever connected to said operating means and arranged to be tilted in opposite directions from the horizontal by the operation of said operating means, a weight carried by said lever and shiftable along it to vary its mechanical advantage when the tilting of the lever is reversed, a stop for limiting the shifting of said weight along the lever, and means for shifting said stop along said lever by the lever movement.

34. In combination, a control member, operating means for operating said control member, a lever connected to said operating means and arranged to be tilted in opposite directions from the horizontal by the operation of said operating means, a weight carried by said lever and shiftable along it to vary its mechanical advantage when the tilting of the lever is reversed, a stop for limiting the shifting of said weight along the lever, and means for shifting said stop along said lever by the lever movement periodically in a predetermined direction along said lever.

35. In combination, a dry-kiln, air-humidifying means therefor, control means for controlling said air-humidifying means, and means responsive to predetermined moisture-value conditions of the air in the dry-kiln for operating said control means, said control means being arranged to vary at each operation the moisture-value of its point of operation.

36. In combination, a dry-kiln, air-humidifying means therefor, a control valve for said air-humidifying means, and means responsive to predetermined moisture-value conditions of the air in the dry-kiln for controlling said control valve, said control valve being arranged to vary at each operation the moisture-value of its point of operation so that it will open and close at widely different moisture-value conditions.

37. A humidity control apparatus, comprising a valve, a fluid-pressure-operated motor-member which by its movements controls said valve, a wet-bulb thermostat connected to said motor-member to govern fluid-pressure acting thereon, and a force-exerting device co-acting with said motor member and arranged to vary materially the force with which it acts when the motor-member passes predetermined points in its movements in opposite directions.

38. A humidity control apparatus, comprising a valve, a power-operated motor-member which by its movements controls said valve, a wet-bulb thermostat connected to said motor-member to govern power acting thereon, and a force-exerting device co-acting with said motor member and arranged to vary materially the force with which it acts when the motor-member passes predetermined points in its movements in opposite directions.

39. A humidity control apparatus, comprising a control member, a power-operated device for operating said control member, a wet-bulb thermostat for governing power supplied to said power-operated device, and a force-exerting device co-acting with said motor-member and arranged to act with different force during the early parts of the movements of said motor-member in opposite directions.

40. A humidity control apparatus, comprising a control valve, a power-operated motor-member which by its movements controls said valve, a wet-bulb thermostat arranged to govern power acting on said motor-member, and means co-operating with said motor-member for producing another force tending to actuate said control valve and for varying said additional force upon each operation of the control valve.

41. A humidity control apparatus, comprising a control valve, and a governing device therefor responsive to variations in moisture-value conditions, said governing device and said valve being arranged at each operation of said control valve to vary the moisture-value of the point of operation of said control valve.

In witness whereof I have hereunto set my hand at Indianapolis, Indiana, this 4th day of April, A. D. one thousand nine hundred and twenty-two.

ARTHUR E. KRICK.